Nov. 19, 1968 — L. E. HARGROVE — 3,412,251

MODE LOCKING IN A SYNCHRONOUSLY MODULATED MASER

Filed April 24, 1964 — 2 Sheets-Sheet 1

INVENTOR
L. E. HARGROVE
BY
ATTORNEY

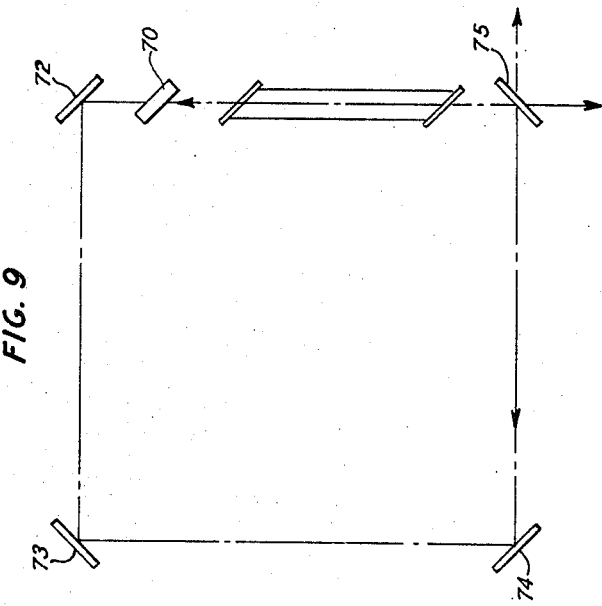
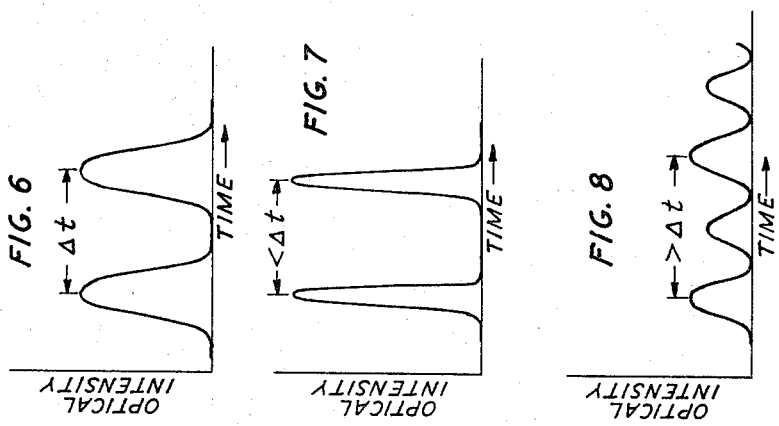
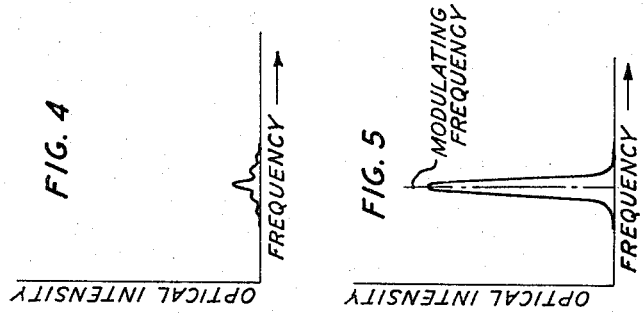

United States Patent Office 3,412,251
Patented Nov. 19, 1968

3,412,251
MODE LOCKING IN A SYNCHRONOUSLY
MODULATED MASER
Logan E. Hargrove, Bernardsville, N.J., assignor to Bell
Telephone Laboratories, Incorporated, New York, N.Y.,
a corporation of New York
Filed Apr. 24, 1964, Ser. No. 362,319
4 Claims. (Cl. 250—199)

ABSTRACT OF THE DISCLOSURE

"Mode locking" or "phase locking" of maser modes refers to the maintaining of a fixed phase relationship, with respect to time, among the oscillating maser frequencies corresponding to the longitudinal modes of the maser resonant cavity. In accordance with the present invention, mode locking is achieved by the intracavity modulation of the maser oscillations at a "synchronous" frequency of the maser cavity. The resulting successive reinforcement of the modulation effect causes all longitudinal modes to couple together with a well-defined amplitude and phase.

---

Figure 1:
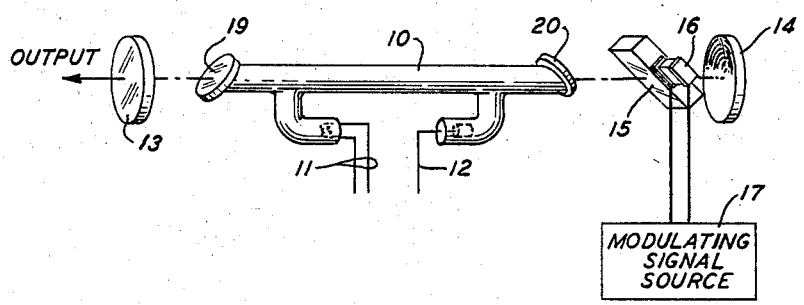
Figure 3:
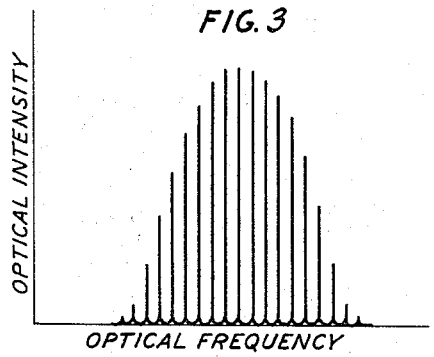

This invention relates to maser oscillators and, in particular, to means for stabilizing the amplitude and frequency of the longitudinal modes generated in such oscillators.

The invention of the maser has made possible the generation and amplification of coherent electromagnetic waves in the macrowave and optical frequency range. The maser, however, has many other possible applications such as, for example, a generator of high frequency pulses, a means for studying the properties of gas plasmas, and as a rotational sensing device.

As developed for use at microwave frequencies, a maser typically comprises a negative temperature medium contained within a cavity resonator tuned to resonance at or near the frequency at which stimulated emission is to be produced. The design of such a cavity resonator at microwave frequencies is a relatively simple matter since the structure can have dimensions which are equal to a single wavelength at the chosen frequency.

The application of this design approach to optical masers is impractical, however, due to the extremely small wavelengths involved. Instead, it has been necessary to design optical cavity resonators with dimensions which are thousands of times larger than the wavelength of signals at the operating frequency.

One such structure which has been employed successfully for this purpose is the Fabry-Perot interferometer comprising two spaced, parallel reflective surfaces. The active medium of the maser is located between the reflective surfaces, at least one of which is partially transmissive to permit coupling out of the device. An optical maser of this type is described in United States Patent 2,929,922 issued to Schawlow and Townes.

Because optical cavity resonators are much larger than the wavelength of the signals employed therein, they are inherently multimode devices. As a consequence, optical maser oscillators are capable of simultaneously oscillating at a plurality of bands of frequencies whose nominal center-to-center spacings $f_c$ are given by $c/2L$, where $c$ is the velocity of light, and $L$ is the effective cavity length. Thus, the output spectrum from an optical maser generator consists of a plurality of spaced, discrete bands of frequencies.

An examination of the output from a maser oscillator discloses that both the amplitude and frequency of these individual bands of frequencies, or, as they are more usually called, longitudinal modes, vary with time in a random fashion. As a consequence, the output from a maser is noisy, being randomly modulated at a frequency given approximately by the separation $f_c$ between adjacent longitudinal modes. This condition materially limits the utility of the maser for many purposes.

It is, accordingly, an object of this invention to stabilize the output from a maser oscillator.

The present invention is based upon the discovery that stabilization of the amplitude and frequency of the longitudinal modes in a maser oscillator can be achieved by internally modulating the maser at a synchronous frequency. The "synchronous" frequency, as used herein, shall be understood as defining a frequency within a band of frequencies whose center is nominally given by $nc/2L$, where $n$ is an integer and L is the effective length of the cavity for the mode at the center of the Doppler-broadened gain curve, and whose bandwith is of the order of $10^{-5}$ $nc/2L$.

When synchronously modulated, the modulation period is equal to $1/n$ of the time required for the wave energy to travel twice the length of the cavity. Each time a given portion of the intracavity wave train makes a transit through the modulating element, the modulation phase is the same. This results in successive reinforcement of the modulation effect within the resonator and assures that the modulation envelopes of the various contributions to the output beam are in phase. In particular, it has been discovered that above a given threshold of modulation, which results in approximately 100 percent modulation of the cavity wave, the effect is to cause all axial modes to couple together with a well-defined amplitude and phase. This condition is referred to as "locked."

In a specific embodiment of the invention to be described in greater detail hereinbelow, an ultrasonically excited fused quartz block is used to modulate the maser wave. The standing ultrasonic wave induced in the block acts as an optical phase grating, producing diffraction orders which fluctuate in intensity at twice the driving frequency.

In the locked state, the maser output consists of a series of pulses whose repetition rate equals the modulating frequency. Locking persists over the range of modulating frequencies within the synchronous band of frequencies. When modulated at a frequency towards the higher end of the synchronous band, there is a pulse sharpening effect accompanied by an increase in the pulse amplitude. At the lower end of the synchronous band there is a tendency for the pulse amplitude to decerase, accompanied by a frequency doubling effect.

Modulation, in accordance with the present invention, is to be distinguished from modulation arrangements intended to convey information. In such arrangements, either the amplitude or frequency of the modulating signal is varied in accordance with the information to be conveyd. In the instant case, however, modulation is utilized to establish a stabilized condition and, hence, once established both the frequency and intensity of the modulating signal are typically maintained constant thereafter. Changes may be made to effect a change in state but again, once the new condition sought is established, the modulating signal is maintained constant.

These and other objects and advantages, the nature of the present invention, and its various features, will appear more fully upon consideration of the various illustrative embodiments now to be described in detail in connection with the accompanying drawings, in which:

FIG. 1 is an illustrative embodiment of the invention utilizing an ultrasonically excited fused quartz block to synchronously modulate a maser beam;

FIGS. 2 to 6, included for purposes of explanation, show various output signals from the maser of FIG. 1 when unmodulated and when synchronously modulated;

FIGS. 7 and 8, included for purposes of explanation, show the output from a synchronously modulated maser as the modulating frequency is varied over the synchronous frequency band; and FIG. 9 shows a synchronously modulated ring laser used for sensing angular rotation.

An illustrative embodiment of the invention, shown in FIG. 1, comprises a maser oscillator and includes means for synchronously modulating the intracavity wave energy.

The maser, which for purposes of illustration may be an optical maser operating in the visible portion of the frequency spectrum, comprises an enclosed, elongated tube 10 within which there is a gaseous active medium. To minimize reflections, the ends 19 and 20 of tube 10 are inclined at the Brewster angle. A D-C power source (not shown) is connected to electrodes 11 ad 12 for supplying the power necessary to maintain a gas discharge within tube 10 for establishing a population inversion in the energy level system of said active medium. It is to be understood, however, that other means, well known in the art, can be employed for producing a population inversion in the maser material. (For a more detailed discussion of the gas maser see "The Laser" by A. Yariv and J. P. Gordon, published in the January 1963 issue of the Proceedings of the Institute of Radio Engineers.)

Tube 10 is located within an optical cavity defined by mirrors 13 and 14. Normally, at least one of the mirrors is made partially transmissive, so that wave energy can be coupled out of the cavity through the mirror.

Located within the cavity, and adjacent to mirror 14, is a modulator 15. The latter comprises a fused quartz block tilted to have its large area surfaces at the Brewster angle with respect to the direction of propagation of the wave energy. An ultrasonic standing wave is induced in the modulator 15 in a direction transverse to the direction of wave propagation in the maser cavity by means of an ultrasonic transducer 16 mounted on one side of modulator 15. Illustrative of such a transducer is an $x$-cut quartz crystal across which a radio frequency signal is impressed.

Because the modulating block 15 supporting the ultrasonic wave is essentially homogeneous twice per ultrasonic period, the frequency of the radio frequency signal applied to the transducer is one-half the frequency at which the light wave is to be modulated. The radio frequency signal is derived from a suitable signal source 17.

The standing ultrasonic wave induced in the modulator acts as an optical phase grating which modulates the cavity wave. (For a more detailed discussion of the diffraction of light by standing ultrasonic waves see C. V. Raman and N. S. Nath, Proceedings of the Indian Academy of Science, A2, 406 (1935); 3, 75 (1936), and B. D. Cook and E. A. Hiedemann, Journal of Acoustical Society of America, 33, 945 (1961). Also see the article entitled "Ultrasonic-Diffraction Shutters for Optical Maser Oscillators," by A. J. De Maria, published in the October 1963 issue of the Journal of Applied Physics.)

It is to be understood that the invention is not limited to ultrasonic modulators but can be practiced using any modulator arrangement capable of operating at the required frequency. Such other modulators comprise combinations of electrooptical materials and suitably oriented polarization prisms.

Figure 2:
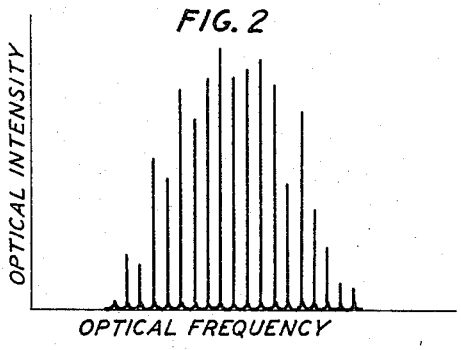

If, with no modulation applied, the output of the maser oscillator as a function of frequency is observed with a scanning interferometer, one typically obtains a picture of the type shown in FIG. 2, which consists of a plurality of narrow spikes. Each of the spikes represents one of the many possible longitudinal modes which exist simultaneously in the maser. As indicated previously, the nominal separation between modes is given by $c/2L$. The number of possible modes depends upon the doppler-broadened linewidth of the maser gain curve.

Where observed on an oscilloscope (and in the absence of special precautions to minimize environmental perturbations), the spikes are seen to vary randomly in amplitude. This random variation is indicative of a noisy output.

As modulation is applied at a frequency within the synchronous band of frequencies, the first noticeable effect is a decrease in the amplitude fluctuations of the spikes. As the modulation is further increased, a well-defined threshold is reached at which point the modes lock, producing an output of the type illustrated in FIG. 3. In contrast to the output depicted in FIG. 2, in the locked condition the spikes are fixed in both amplitude and frequency. Furthermore, observations over a prolonged period of time disclose no perceptible change in this output.

The effect of locking is further illustrated in a second set of comparative observations made of the detected maser output by means of a radio frequency spectrum analyzer which scans over a portion of the frequency spectrum which includes the modulating frequency. With no modulation applied, the signal produced in the spectrum analyzer appears, as illustrated in FIG. 4, as a slight variation along the horizontal axis. The signal, which is ill defined as to frequency, and noisy, is the result of beating between modes.

With the maser synchronously modulated above the threshold level, a large, well-defined and stable indication is produced at the frequency of the modulating signal, as shown in FIG. 5. The indications in this figure and in FIG. 4 were made at the same gain settings of the measuring equipment.

FIG. 6 shows the intensity of the maser output on a time scale consisting of a series of pulses whose repetition rate is given by the modulating frequency.

FIGS. 7 and 8 show the effect of varying the modulation frequency over the synchronous band. As the modulation frequency is raised the pulses increase in frequency and become slightly narrower. This is illustrated in FIG. 7 in which the pulses are slightly narrower and have a larger amplitude than those shown in FIG. 6.

As the modulating frequency is decreased, there is a broadening of the pulses and an accompanying decrease in peak amplitude. A further decrease in the modulating frequency produces a frequency doubling effect. This is illustrated in FIG. 8 which shows twice as many pulses of reduced height as were obtained for the situation depicted in either FIGS. 6 or 7 for the same period of time.

An operative embodiment of the invention was constructed using a D-C discharge, He-Ne optical maser having a one meter discharge length, located in a 2.66 meter cavity.

Each of the mirrors 13 and 14 had a ten meter radius of curvature and a dielectric coating peaked for operation at 6328 A.

The modulator 15 comprised a fused quartz block whose perpendicular distance between the faces through which the maser beam passed was 0.5 inch. The dimension perpendicular to the direction of beam propagation was 1.0 inch. An $x$-cut quartz transducer 16 (which had a 4.0 mc. fundamental frequency) was driven at 28 mc. so as to modulate the light beam at 56 mc., which corresponded to the nominal mode spacings for the particular cavity spacing used.

The amplitude of the signal applied to the transducer to produce mode locking in this particular embodiment was 6.5 volts. Below this threshold level, the output modulation signal was noticeably erratic. Between 6.5 volts and about 30 volts, the amplitude of the output modulation signal was substantially constant. This indicated that locking occurred when the cavity beam was modulated close to 100 percent. At larger values of signal applied to transducer 16, the modulation amplitude decreased and stopped completely at 135 volts.

FIG. 9 illustrates an application of an optical maser in which longitudinal mode stability is of importance. It is a ring maser, used as a rotational rate sensing device in the manner described by W. M. Macek and D. T. M. Davis, Jr. in their article "Rotation Rate Sensing With Traveling-Wave Ring Lasers," published in the Feb. 1, 1963 issue of Applied Physics Letters. As described in this article, rotation of the maser produces a differential cavity path-length for the two oppositely traveling waves. This, in turn, produces a slight frequency difference between the oppositely traveling waves which is proportional to the angular velocity. It is apparent, however, that to detect small frequency differences resulting from low angular velocities requires mode stability in the oscillator. Accordingly, a modulator 70 for synchronously modulating the maser is advantageously included within the maser cavity defined by the reflecting mirrors 72, 73, 74 and 75.

Thus, in all cases it is understood that the above-described arrangements are illustrative of a small number of the many possible specific embodiments which can represent applications of the principles of the invention. Numerous and varied other arrangements can readily be devised in accordance with these principles by those skilled in the art without departing from the spirit and scope of the invention.

What is claimed is:
1. Apparatus including:
   a maser oscillator comprising an active medium disposed within a cavity;
   means located within said cavity for modulating the oscillations of said maser characterized in that said modulation occurs at a synchronous frequency of said cavity, and in that the amplitude of said modulation is above the threshold level required to produce longitudinal mode locking;
   and means for extracting radiant energy from said cavity.

2. The apparatus according to claim 1 wherein said modulating frequency is substantially equal to $nc/2L$, where $n$ is an integer, $c$ is the velocity of light, and $L$ is the effective cavity length.

3. A maser oscillator including:
   an active maser medium located within a cavity comprising a pair of spaced reflective surfaces;
   at least one of said surfaces being partially transmissive;
   means for stimulating within said medium emission of wave energy in a plurality of longitudinal modes, substantially all of said energy being iteratively reflected between said surfaces along a given beam path, with a portion of said energy being extracted from said cavity through said partially transmissive surface;
   and means located within said cavity along said beam path for amplitude modulating said beam characterized in that said modulation occurs at a synchronous frequency of said cavity, and in that the amplitude of said modulation is above the threshold level required to produce longitudinal mode locking.

4. The oscillator according to claim 3 wherein said modulator comprises a ultrasonically excited fused quartz block.

References Cited
UNITED STATES PATENTS

| | | | |
|---|---|---|---|
| 3,170,122 | 2/1965 | Bennett | 250—199 X |
| 3,299,223 | 1/1966 | Miller | 250—199 X |
| 3,297,876 | 1/1967 | De Maria | 250—199 |

ROBERT L. GRIFFIN, *Primary Examiner.*

A. MAYER, *Assistant Examiner.*